June 28, 1960

J. W. HODGES 2,942,618

HIGH-LOW AUTOMATIC SHUT-OFF VALVE

Filed Aug. 21, 1958

INVENTOR.
JAMES W. HODGES

BY
Robert O. Spindle
ATTORNEY

United States Patent Office 2,942,618
Patented June 28, 1960

2,942,618
HIGH-LOW AUTOMATIC SHUT-OFF VALVE

James W. Hodges, Beaumont, Tex., assignor to Sun Oil Company, Philadelphia, Pa., a corporation of New Jersey Filed Aug. 21, 1958, Ser. No. 756,404

7 Claims. (Cl. 137—458)

This invention relates in general to fluid flow control valves automatically operative to close at fluid pressures above and below predetermined values for the fluid passing through the valved system and specifically to that form of such valve using a ball element to shut off the fluid flow through the valve body.

Valves of the specific type in which a ball element closes the flow passage through a valve in response to variations in pressures are known. Those valve are complex mechanisms of ball retainers, levers and latch elements. It is the primary object of this invention to provide a simplified valve of this type having improved operating characteristics.

The improved automatic shut-off valve according to the present invention comprises a valve body adapted to position a valve seat and a ball closure element which is made of magnetically responsive material. A magnetized plunger resiliently positioned in the valve body and susceptible of response to fluid pressure above a predetermined value holds the ball closure element from the valve seat during normal operation. An increase in pressure above such predetermined value forces the magnetized plunger from the ball retaining position causing the ball to drop to the valve seat and effect closure. A second plunger, which is non-magnetized and which is responsive to fluid pressure below a predetermined value, will move when the pressure decreases below such value and dislodge the ball closure element from the magnetized plunger, thereby also causing the valve to close.

The invention is more specifically described with reference to the accompanying drawings in which.

Figure 1:
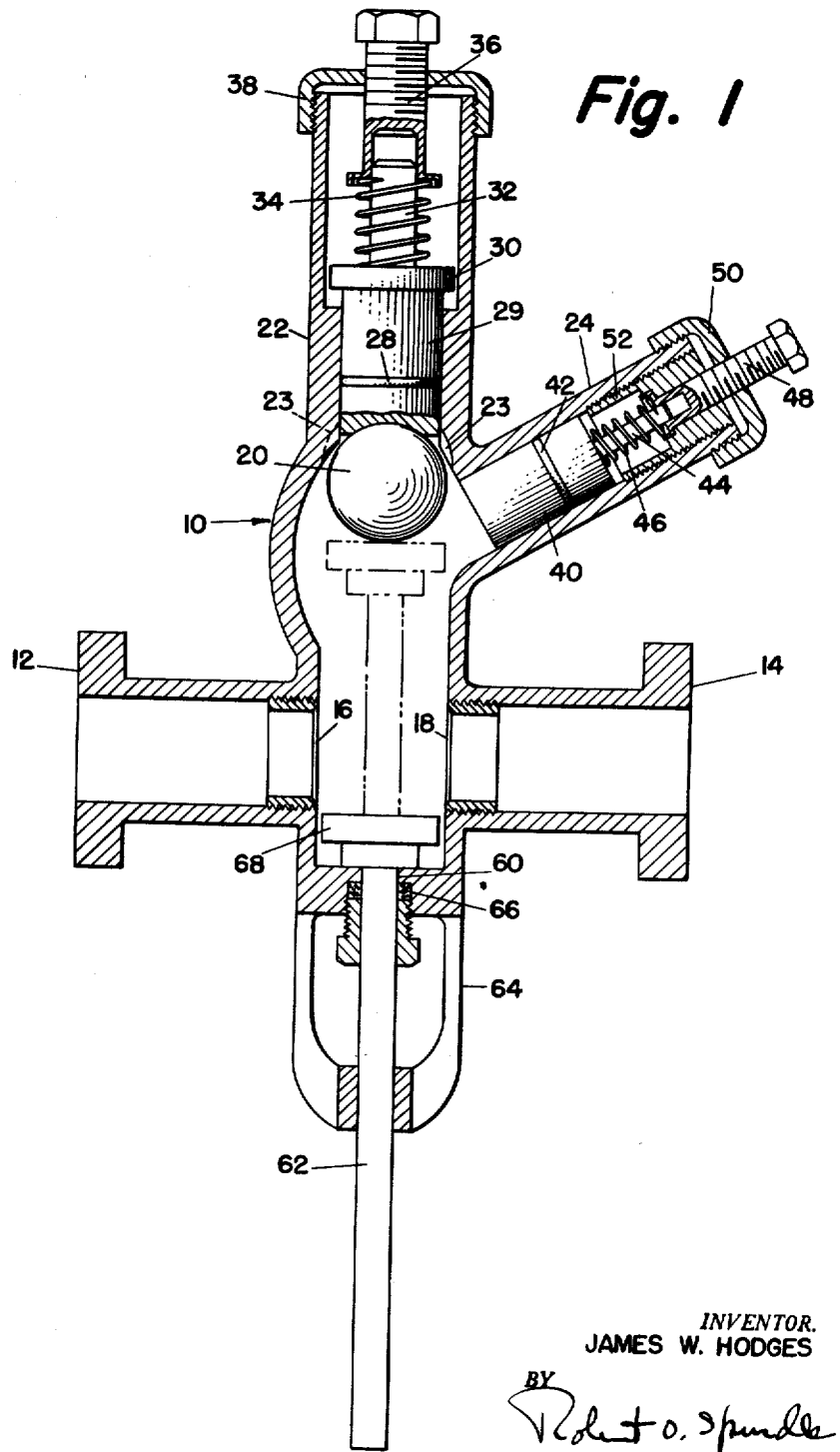
Figure 1 is an elevational view partly in cross-section of one form of the device showing the ball closure element in open position.

Referring to Figure 1, a form of the valve of this invention is shown with all the moving elements in normal position for passage of fluids. The valve body 10 of non-magnetic material such as bronze, provides an inlet 12 and outlet 14, depending on the direction of flow. It will be evident that the fluid may enter and leave the valve from either direction, for the movable elements respond to pressures and not to flow of the controlled fluids. Two valve seats 16 and 18 are provided so that the flow can be in either direction. The closure means 20 shown as a ball of magnetically responsive material is adapted to cooperate with the valve seats in sealing relation.

The valve body 10 carries two plunger housings 22 and 24. The illustrated position of these housings is one form possible of use. However, any other position which allows the separation of closure element 20 from the magnetic field holding it by movement of the plungers in these housings and allows the closure element to move into the seats 16 or 18 can be employed.

In the form shown and described, plunger housing 22 positions a magnetized plunger 29. In addition to being magnetized for separable engagement of the closure element 20, cylindrical plunger 29 carries an O-ring 28 for sealing purposes. A shoulder 30 of enlarged diameter prevents the plunger from dropping into the valve body 10 under conditions of decreased pressure and the extension 32 above the shoulder 30 positions spring 34 which presses downwardly on the shoulder. The member 36 for varying the compression on spring 34 threadedly engages a cap 38 at the upper end of the housing 22. Slotted openings 23 at the base of housing 22 serve to balance pressures around ball 20 permitting release as later described.

The second plunger housing 24 is positioned on an axis which will intersect the axis of the housing 22 described above. No restrictions are placed on the angle of intersection, the only requirement being that the dislodgement of the ball from the magnetic field of plunger 29 will occur when the pressure drops below a predetermined value. This is effected by non-magnetized plunger 40 which slides in the housing 24 in response to a decrease in pressure occurring in the valve body and along the chosen intersecting axis.

As described above for plunger 29, this non-magnetized plunger 40 also mounts an O-ring 42 for sealing purposes. An arm 44 extending from the face of the plunger outwardly of the valve body centers spring 46 which compressively bears against threaded adjustable member 48. Cap 50 threadedly engaging member 48 closes the outer end of housing 24. A threadedly adjustable collar 52 restricts the distance of outward travel of plunger 40 under conditions of high pressure and maintains the plunger in position for reduced pressure operation.

A guide member 64, attached at the bottom of valve body 10 and preferably in line with the first housing 22, carries a rod 62 which extends through port 60. Rod 62 forms the means for returning the ball 20 to normal position after operation. An engaging element 68 affixed to the rod inside the valve is positioned as shown to locate the ball 20 in closing position with the valve seats 16 or 18. As indicated by dotted lines in Figure 1, lifting of the ball by pushing rod 62 upwardly returns the ball to the magnetic field of plunger 29. In valves used for high pressures, rod 62 can be threaded and operated by turning.

Figure 2:
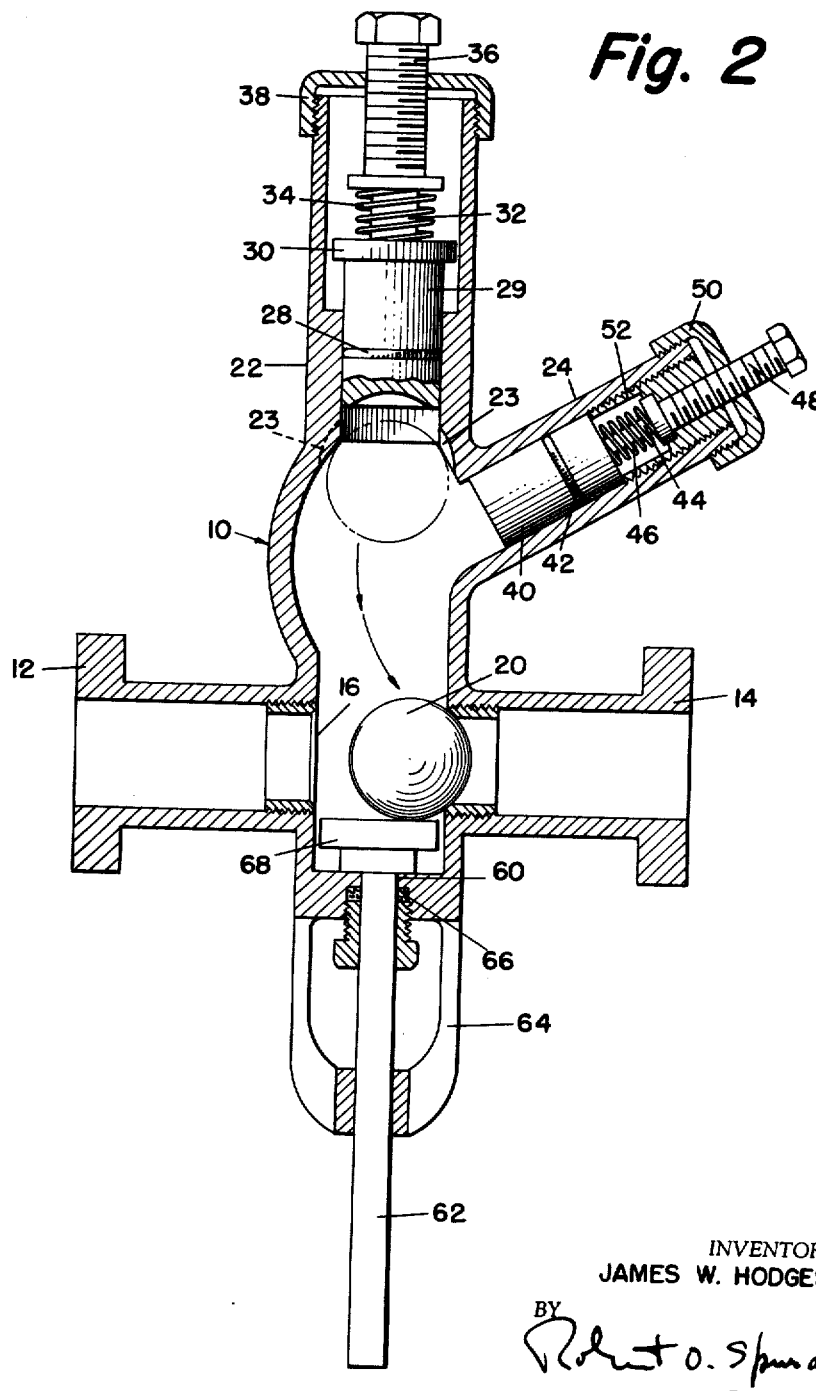
Figure 2 is a view similar to Figure 1 showing the relative positions of the moving elements under conditions of increased pressure.
Figure 3:
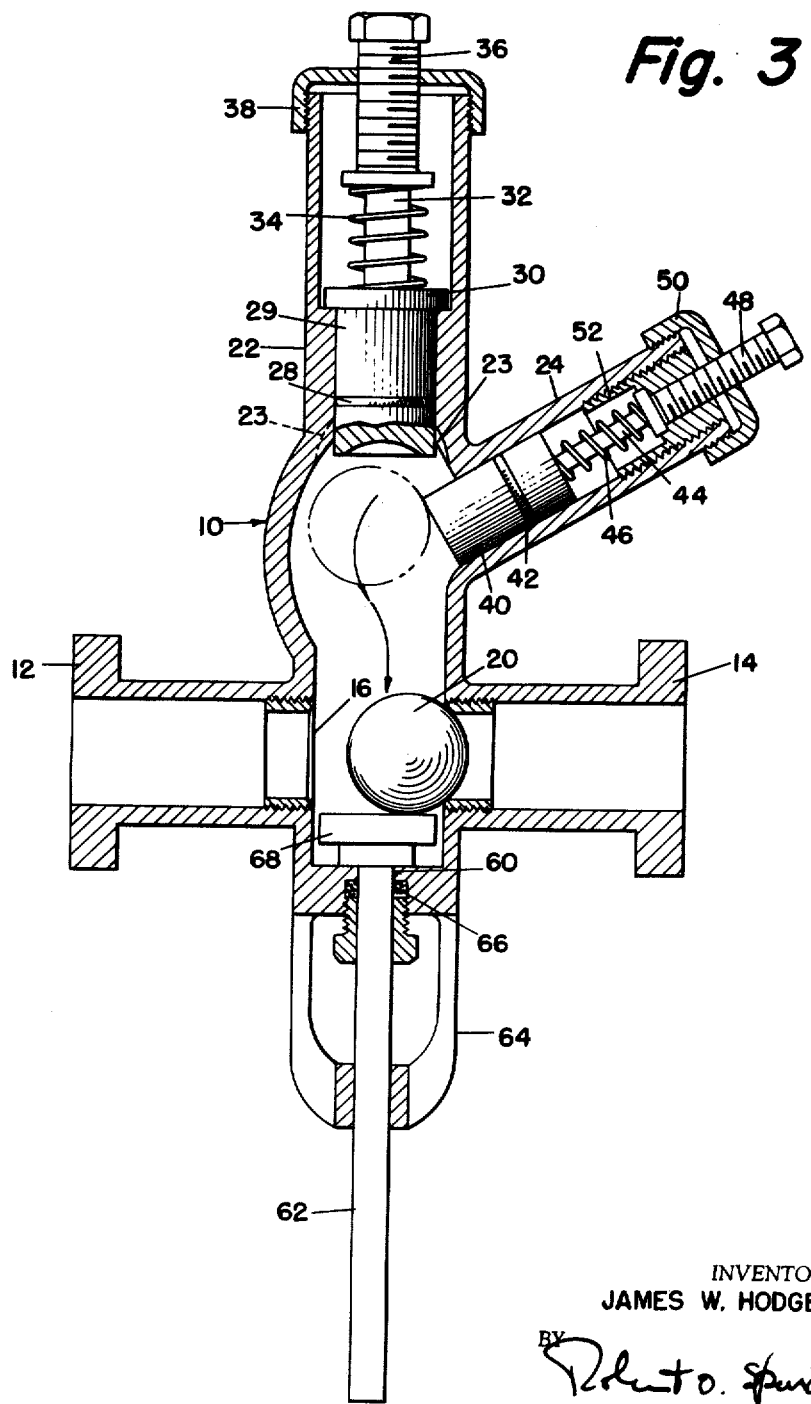
Figure 3 is a view similar to Figure 1 showing the relative positions of the moving elements under conditions of decreased pressure.

For a clear understanding of the operation of the above-described valve, Figures 2 and 3 should be considered in conjunction with Figure 1. Each of these figures shows a different operating condition. As indicated above, Figure 1 illustrates the normal position for operation with the closure member 20 withdrawn from the flowing stream path. Additionally the method of resuming the normal position after closure is indicated. Figure 2 shows the response of the movable elements to a condition of excessive pressure. Lastly, Figure 3 shows the movable elements' response to decreased pressure.

With the valve elements in the position shown in Figure 1, a pressure condition above a predetermined value dependent upon the compression of spring 34 will urge plunger 29 outwardly of the valve body in opposition to the spring. Plunger 40 is also urged outwardly until stopped by engagement with collar 52. Housing 22 has a diameter less than that of the closure element 20, thus presenting a disengaging means beyond which element 20 cannot follow the magnetic plunger. The peripheral slots 23 permit pressures to balance on the exposed surface of the ball allowing its release from the magnetic attraction of plunger 29. Upon being sufficiently separated from the effect of the magnetic field existing in plunger 29 the ball or closure element 20 will drop into the fluid stream passing through the valve and then become wedged in the seat 18 as illustrated in Figure 2. In the event that flow through the valve is in the opposite direction, the ball will become wedged in valve seat 16. Thereafter the valve can be opened again by raising ball 20 by forcing piston 62 upwardly until the ball re-engages the magnetic field of piston 29 and assumes its normal position as indicated in Figure 1.

Figure 3 indicates the cooperation of plungers 29 and 40 under conditions of decreased pressure under which closure element 20 is also released. When the pressure decreases in valve body 10, both plungers 29 and 40 move inwardly toward each other under the influence of adjusted compression springs 34 and 46. Because of the slots 23, ball 20 is pressure balanced and does not tend to form sealing contact with the housing 22. Ball 20 is positioned to be engaged by plunger 40 which thereby separates it from the magnetized plunger 29. The ball drops to the bottom of the valve body and is moved into sealing engagement with valve seat 18 by the flowing fluid, as indicated in Figure 3.

Figure 4:
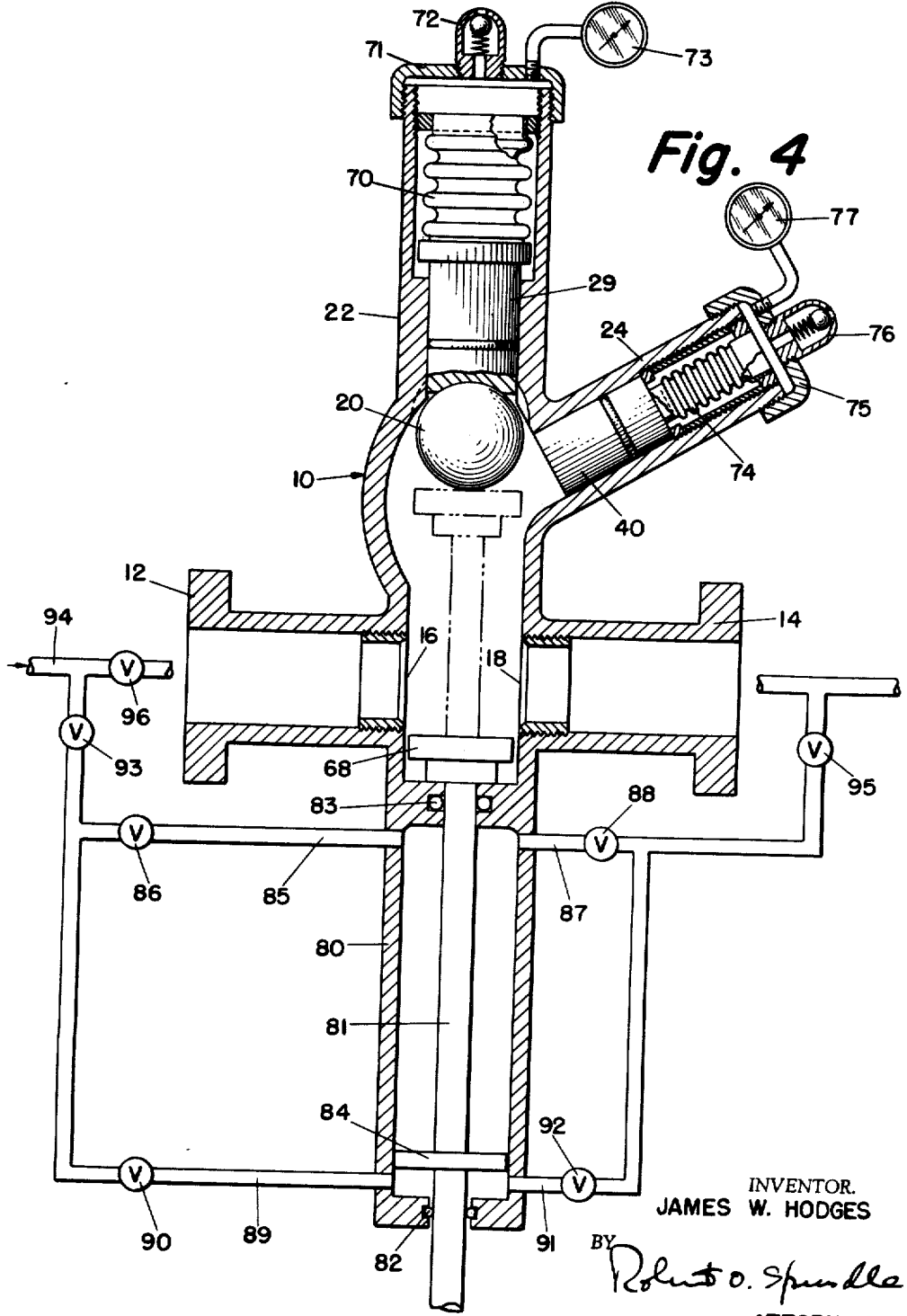
Figure 4 is an elevational view partly in cross-section illustrating another form of the device.

Referring now to Figure 4, a modified form of the valve is shown which utilizes bellows instead of springs for operating the plungers to effect release of the ball closure element. The valve also is provided with means for resetting the valve after closure by utilizing the fluid pressure from the feed line leading to the valve.

The valve illustrated in Figure 4 has a valve body 10, inlet and outlets 12 and 14, valve seats 16 and 18, plunger housings 22 and 24, plungers 29 and 40 and an engaging element 68, all as described in connection with Figure 1. Housing 22 contains a high pressure bellows 70 attached to plunger 29, and the housing is closed at its upper end by cap 71 which carries a pressure loading valve 72 and a pressure gauge 73. Similarly, housing 24 contains a low pressure bellows 74 affixed to plunger 40 and is also closed by cap 75 which carries pressure loading valve 76 and pressure gauge 77.

Bellows 70 is pressurized with air or other gas through valve 72 to a predetermined pressure at which the net force acting down on plunger 29 will equal the net upward force resulting when the maximum permissible fluid pressure in valve body 10 has been reached. Thus, when the pressure in valve body 10 exceeds such maximum pressure, magnetized plunger 29 will be forced upwardly in opposition to bellows 70 and the ball 20 will drop to the closed position.

The other bellows 74 is pressurized through valve 76 to a predetermined low pressure which will cause closure when the fluid pressure in the valve body 10 drops below the minimum permissible value. A decrease in fluid pressure below such value will cause bellows 74 to force plunger 40 against the ball 20 and disengage it from the magnetic field of plunger 29, thus likewise allowing the ball to drop to closed position.

The lower portion of Figure 4 illustrates the means whereby the inlet fluid pressure can be utilized to return ball 20 to the open position by means of engaging element 68. The lower portion of the valve body carries another housing 80 through which rod 81 extends. The rod passes through openings in the bottom and top of the housing in which are provided O-rings 82 and 83 to prevent leakage, and the upper end of rod 81 is affixed to the engaging element 68. The rod carries a piston 84, shown at its lowermost position in Figure 4, which divides the space within the housing into upper and lower fluid chambers. The upper chamber has a fluid inlet line 85 containing valve 86 and a fluid outlet line 87 containing valve 88. Likewise, the lower chamber is provided with a fluid inlet line 89 containing valve 90 and a fluid outlet line 91 containing valve 92. Each of the inlet lines are connected through valve 93 to feed line 94, while the outlet lines lead through valve 95 to the outlet from the automatic shut-off valve. Feed line 94 contains a valve 96 ahead of its connection with the automatic shut-off valve.

Whenever it is desired to open the automatic valve after closure, feed valve 96 is closed and valves 93 and 90 are opened so as to admit fluid under pressure beneath piston 84. Valves 86 and 92 remain closed at this time but valves 88 and 95 are opened to release fluid from above the piston. The resulting differential pressure raises piston 84 and simultaneously raises engaging element 68 until ball 20 has reached its uppermost position. Then, valves 90 and 88 are closed and valves 86 and 92 are opened, thus reversing the pressure levels in the upper and lower chambers in housing 80. This returns the engaging element 68 and piston 84 to their lowermost positions. Thereafter, valves 93, 86, 92 and 95 are closed, and flow through the automatic shut-off valve can be resumed by opening valve 96.

In the piping arrangement described above, valves 93 and 95 are not essential and can be omitted. However, it is desirable to include them as a safety measure so that repairs can be made in the piping leading to and from housing 80 in the event that a leak or break occurs.

It may be seen that the above-described valves are of simple construction and comparatively free of possibilities of inoperation. As distinguished from existing high and low pressure shut-off valves, retention and latching elements subject to corrosion and clogging by the materials passing through such valves are eliminated. Operation resulting from pressure conditions for which the valve is designed is direct, being applied to the responsive elements without intervening structure.

I claim:

1. An automatic valve responsive to high and low pressure variations in the fluid to be valved comprising a valve body having an inlet and an outlet; a valve seat at the outlet, closure means of magnetic material in said body arranged to operably contact said valve seat, a sliding magnetized plunger extending into said body and positioned to magnetically withhold said closure means from seating, said plunger being forced outwardly of said body in response to an excessive pressure condition, stop means positioned to abut said closure means when said plunger is forced outwardly, thereby releasing said closure means, and a non-magnetic plunger urged inwardly of said body by a biasing means and positioned to disengage said closure means from the magnetized plunger upon moving inwardly in response to a reduced pressure condition.

2. An automatic valve responsive to high and low pressure variations in the fluid to be valved comprising a valve body having a passage therethrough; a ball of magnetic material in said body arranged to close said passage when seated, a magnetized plunger slidably extending into said body and positioned to hold said ball from seated position under normal operating conditions, said plunger being forced outwardly of said body under high pressure conditions, stop means positioned to abut said ball when said plunger is forced outwardly, thereby releasing said ball, a non-magnetic plunger extending into said body and positioned to disengage said ball from the magnetized plunger when said non-magnetic plunger moves inwardly in response to low pressure conditions, and resetting means positioned in said body and operable to move said ball from seated position into contact with the magnetized plunger, for repeated valve operation.

3. A valve according to claim 2, including also adjustable springs for urging each of said plungers inwardly of the valve body.

4. A valve according to claim 2, including also bellows for urging each of said plungers inwardly of the valve body, and means for pressurizing said bellows to predetermined pressure levels.

5. A valve for use in fluid transmission lines and adapted to automatically shut off the flow of fluid therethrough in response to diminished fluid pressures comprising a valve body having an inlet and an outlet; a ball of magnetic material in said body and arranged to seat in said outlet, magnetized means extending into said body for releasably holding said ball from seated position under normal operating conditions, non-magnetic diminished pressure responsive means extending into said body and positioned to disengage said ball from the magnetized means when said non-magnetic pressure responsive means moves inwardly in response to diminished pressure conditions, and means slidable in said body for moving said ball into magnetic engagement with the magnetized means, to reactivate the valve after the shut off operation.

6. In an automatic fluid flow control valve wherein a ball of magnetic material in the valve body operates to close the outlet path through the valve body under conditions of excessive or diminished pressures of the flowing fluid, the improvement in the control means for said ball comprising two resiliently urged plungers slidably responsive to pressure changes and positioned to enter the valve body on intercepting operating paths, one of said plungers being magnetized to hold said ball away from the outlet of the valve but being moved outwardly of the valve body in response to excessive pressure, stop means positioned to abut said ball when said one plunger is moved outwardly, thereby disengaging said ball from said one plunger, and the second plunger being positioned to intercept and release the magnetically held ball as said second plunger moves inwardly into the valve body in response to diminishing pressure.

7. The improvement in an automatic flow control valve as defined in claim 6, further characterized by a slidable element extending into the valve body for moving the ball into contact with the magnetized plunger to reset the valve, after the closure operation.

No references cited.